(12) United States Patent
Passage

(10) Patent No.: US 7,661,762 B2
(45) Date of Patent: Feb. 16, 2010

(54) UNIVERSAL VEHICLE DOOR ARMREST

(75) Inventor: Christopher Passage, 5781 Sagebrook Dr., Park City, UT (US) 84098

(73) Assignee: Christopher Passage, Park City, UT (US)

( * ) Notice: Subject to any disclaimer, the term of this patent is extended or adjusted under 35 U.S.C. 154(b) by 0 days.

(21) Appl. No.: 12/024,594

(22) Filed: Feb. 1, 2008

(65) Prior Publication Data
US 2008/0185895 A1 Aug. 7, 2008

Related U.S. Application Data

(60) Provisional application No. 60/898,804, filed on Feb. 1, 2007.

(51) Int. Cl.
*B60N 3/02* (2006.01)
*B60J 9/00* (2006.01)

(52) U.S. Cl. .............. 297/411.22; 296/153; 248/118

(58) Field of Classification Search ............ 297/411.22; 296/153; 248/118
See application file for complete search history.

(56) References Cited

U.S. PATENT DOCUMENTS

| | | | | |
|---|---|---|---|---|
| 2,709,620 A * | 5/1955 | Tinsley et al. | ............... | 296/153 |
| 2,838,340 A * | 6/1958 | Johnson | .................. | 296/153 X |
| 2,948,565 A * | 8/1960 | Johnson | ...................... | 296/153 |
| 3,326,600 A * | 6/1967 | Mathews | ..................... | 296/153 |
| 5,205,606 A * | 4/1993 | Cassese | .................. | 296/153 X |
| 7,484,809 B2 * | 2/2009 | Hughes | ............... | 297/411.22 X |

* cited by examiner

*Primary Examiner*—Anthony D Barfield
(74) *Attorney, Agent, or Firm*—Steven L. Nichols; Bryan G. Pratt; Brian J. Riddle

(57) ABSTRACT

A customizable armrest includes a cushioning pad and a rigid, single support unit being configured to couple the cushioning pad. The rigid, single support unit includes an armrest retention protrusion pivotably coupled to the single support unit. Furthermore, the armrest retention protrusion is configured to be mounted in a window orifice of a vehicle.

3 Claims, 7 Drawing Sheets

UNIVERSAL VEHICLE DOOR ARMREST

RELATED APPLICATIONS

This application claims the benefit under 35 U.S.C. § 119 (e) of U.S. Provisional Patent Application No. 60/898,804 filed Feb. 1, 2007 titled "Vehicle Door Elbow/Arm Rest "ARM-RESTLER ™" which provisional application is incorporated herein by reference in its entirety

FIELD

The present system and method relate to an arm resting device for use on a vehicle door. More specifically, the present exemplary system and method relate to a universal armrest configured to be customized for selective placement in a door of any vehicle.

BACKGROUND

Many drivers of automobiles tend to place their elbow or arm on the door of their vehicle while operating the vehicle. When asked, many drivers who have this tendency agree that after a short time that their elbow and/or arm becomes sore or fatigued from resting on the hard plastic that usually makes up the vehicle door.

A number of systems have been developed to increase the comfort for vehicle operators that tend to place their elbow or arm on the door of their vehicle. For example, U.S. Pat. No. 5,320,401 discloses a vehicle arm rest that latches to the underside of a door panel between the window and panel weather stripping by use of a strap with projections which leans against the interior of a door panel. Other similar devices have been proposed with varied attaching methods. There are apparent drawbacks to these types of devices. Particularly, the majority of vehicles are excluded from the use of such devices. Traditional designs do not accommodate a variety of vehicles because they fail to provide means to properly flush or level their frames against the interior door/window panel of the vehicles due to the vast variation in contours, thickness and geometric shapes of the panels.

SUMMARY

An armrest includes a cushioning pad, a rigid, single support unit, that is configured to support the cushioning pad, and wherein the rigid, single support unit includes a mounting protrusion pivotably coupled thereto, wherein the mounting protrusion includes a plurality of trim reliefs and wherein the mounting protrusion is configured to be mounted in a window orifice of a vehicle.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

The present exemplary system and method provides a universal armrest that is customizable for selective placement of the armrest in a door of any vehicle. Particularly, according to one exemplary embodiment, the present exemplary armrest system and method includes a single formed frame or structure configured to securely hold a comfortably soft rest member. Additionally, according to one exemplary embodiment, the single formed support frame includes one or more sizing members configured to facilitate a user in trimming the support frame for use with various vehicles. Further details of the present exemplary system and method will be provided below.

As used in the present exemplary specification, and in the appended claims, the term "relief" shall be interpreted broadly as including any indentation, perforation, guide, frangible connection, or other feature configured to facilitate the trimming of an armrest retention member.

In the following description, for purposes of explanation, numerous specific details are set forth in order to provide a thorough understanding of the present system and method for producing a novel armrest system. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
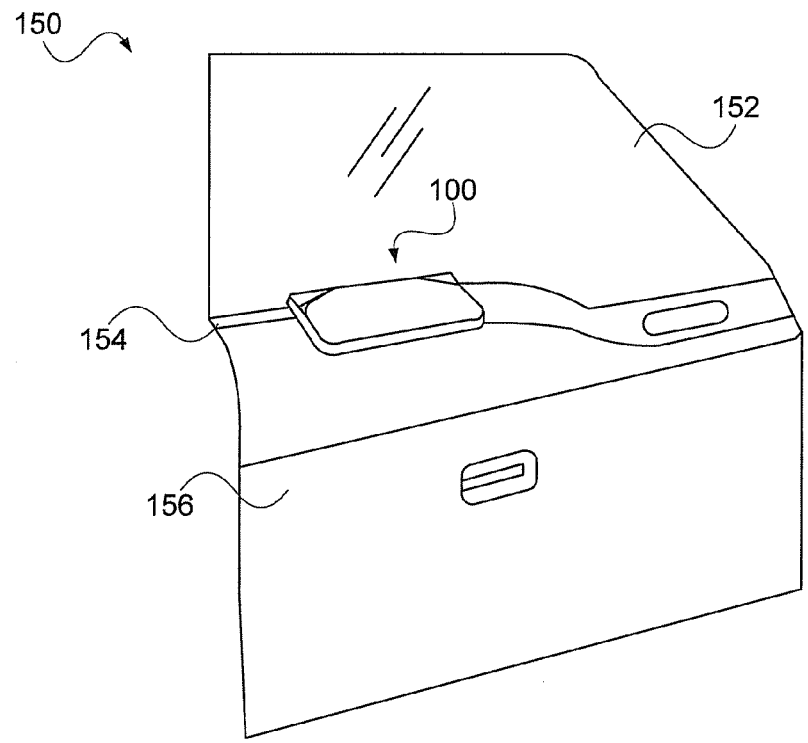
FIG. 1 is a perspective view of the present exemplary armrest coupled to the interior of a vehicle door, according to one exemplary embodiment.

FIG. 1 illustrates an exemplary armrest installed on the door (150) of a vehicle, according to one exemplary embodiment. As illustrated, the exemplary armrest (100) is securely disposed between the weather stripping (154) and the window (152) portions of the door panel (156). As mentioned, the ability to securely mount the armrest (100) on any number of automobile door (150) configurations provides installment flexibility not enjoyed by the previously disclosed armrests.

Figure 2:
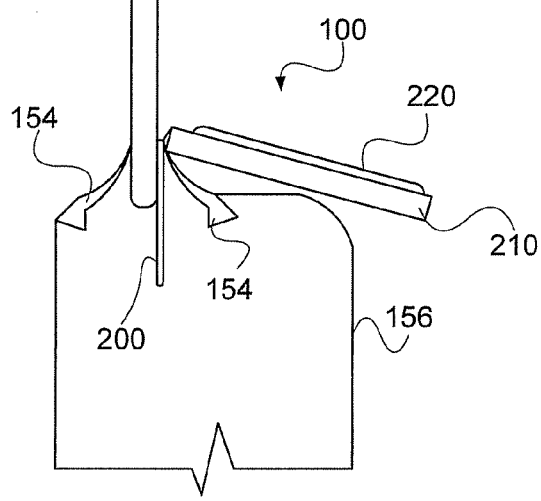
FIG. 2 is a cross-sectional side view of an armrest coupled to the interior of a vehicle door, according to one exemplary embodiment.

FIG. 2 further illustrates the installment of the exemplary armrest (100) in the door panel (156). As illustrated, the exemplary armrest (100) includes a comfort pad (220) housed within a single molded pad retention frame (210). An armrest retention member (200) is flexibly coupled to the pad retention member (210). According to one exemplary embodiment, the armrest retention member (200) is disposed between the window (152) and the bottom weather stripping (154) on the internal side of the door panel (156). As is generally known, automobile doors (150) come in a variety of sizes and styles. Additionally, the internal mechanisms associated with automatic windows, door locks, and mirrors vary the amount of available space located within the automobile door (150) between the door panel (156) and the window (152). As used herein, and in the appended claims, the space between the inner door panel (156) and the window shall be referred to as the window orifice. As will be described in further detail below, the present exemplary armrest system (100) provides for convenient adjustment of the armrest retention member (200) such that the armrest can be used with any number of vehicles and vehicle door (150) configurations.

Figure 3:
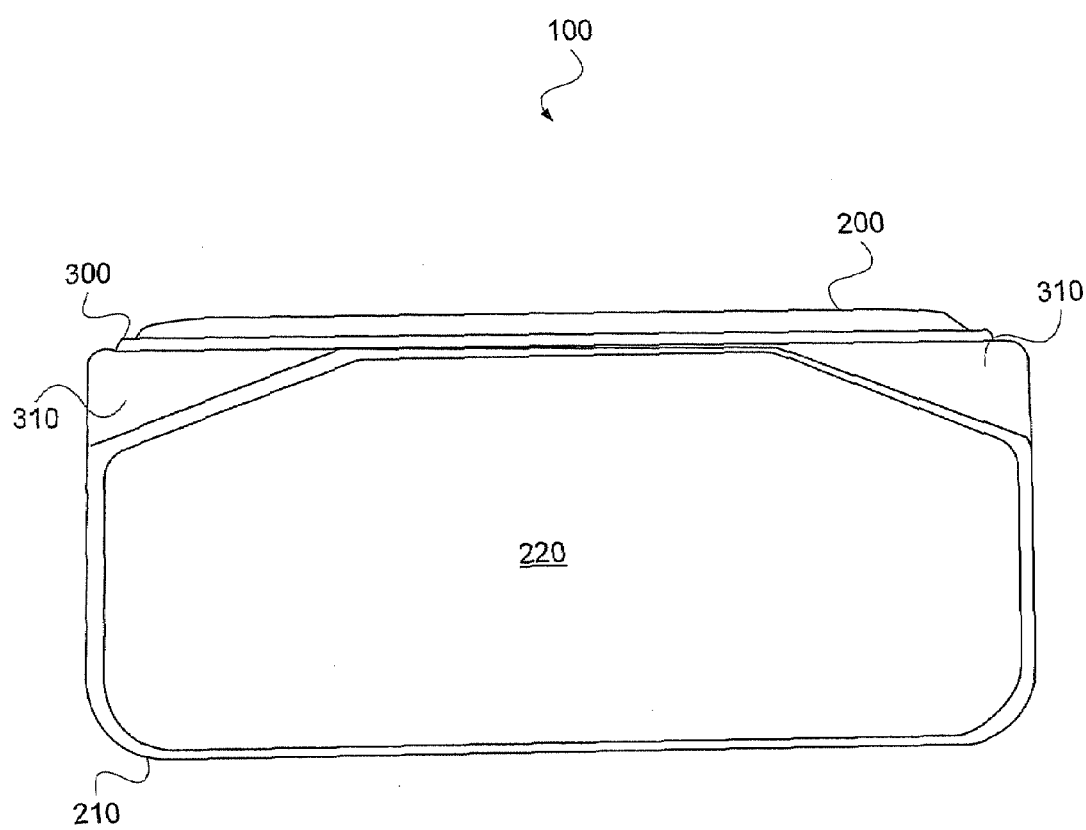
FIG. 3 is a front view of an assembled armrest, according to one exemplary embodiment.

FIG. 3 is a frontal view of the present exemplary armrest (100), according to one exemplary embodiment. As illustrated, the exemplary armrest includes a pad retention member (210) securely coupling a comfort pad. As previously mentioned, the pad retention member (210), according to one exemplary embodiment, is a single molded piece, including the armrest retention member (200) coupled to the pad retention member by a hinged member (300). According to one exemplary embodiment, the pad retention member (210), including the armrest retention member (200) and the hinge member (300) are all formed by an appropriate forming process including, but in no way limited to, injection molding, blow molding, thermo-molding, stamping, and the like. Additionally, the present exemplary pad retention member (210) may be formed of any appropriate structural material including, but in no way limited to, plastics, composites, metal, and the like.

Figure 7:
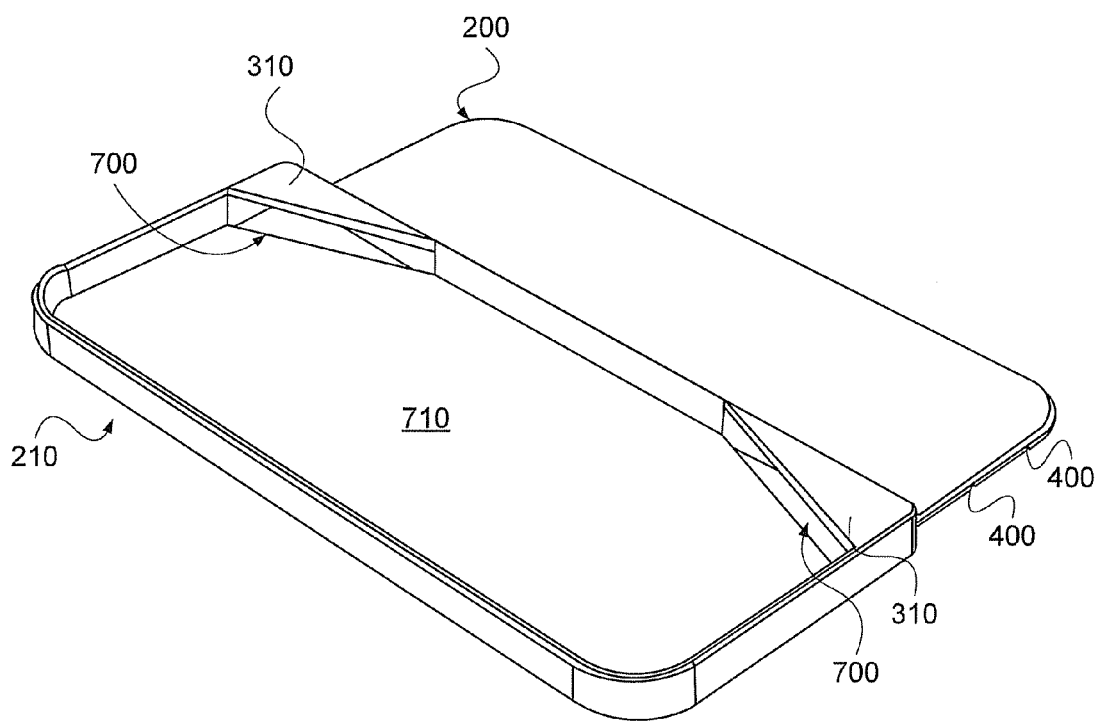
FIG. 7 is a perspective view of an armrest pad retention frame, according to one exemplary embodiment.

According to the exemplary embodiment illustrated in FIGS. 3 and 7, the exemplary pad retention member (210) comprises a generally rectangular shape including a pad reception base (710) and a number of vertical walls. As illustrated, the exemplary pad retention member (210) includes at least one pad interference member (310) integrally formed in the wall of the pad retention member such that it overhangs a portion of the interior space defined by the pad retention member. Consequently a recessed retention orifice (700) is formed within the pad retention member (210) such that an armrest retention member (200) inserted into the pad retention member may rest upon the pad reception base (710) and be secured within the recessed retention orifice (700) under the pad interference member (310).

Additionally, as illustrated in FIG. 3, the armrest retention member (200) is secured to the pad retention member (210) by the hinge member (300). According to one exemplary embodiment, the hinge member (300) is configured to allow the armrest retention member (200) to rotate about the pad retention member (210). Accordingly the pad retention member (210), and consequently the comfort pad (220) may be easily positioned as desired by a user, while the armrest retention member (200) maintains a substantially vertical orientation within the door panel (156). According to one exemplary embodiment, the hinge member (300) is formed by molding or otherwise forming a strip of material that has a thinner cross-section than the remainder of the pad retention member (210). Accordingly, if a bend results from the imparting of a force upon the pad retention member, the bend will occur within the hinge member (300). Additionally, the relative thickness may be adjusted to vary the force used to positionally orient the armrest retention member (200) with respect to the pad retention member (210). While the hinge member (300) has been described as a reduced thickness in the material forming the pad retention member (210), any number of alternative configurations or systems may be used including, but in no way limited to, the removal of material, the use of bands, separate hinged members, pins, compliant material configurations, and the like. Indeed, the coupling of the pad retention member (210) to the armrest retention member with the hinge member (300) allows for the comfort pad (220) to be positionally secured without detachment, adapting to any vehicle door angle, while securing the present exemplary system onto the vehicle door (150).

Figure 8:
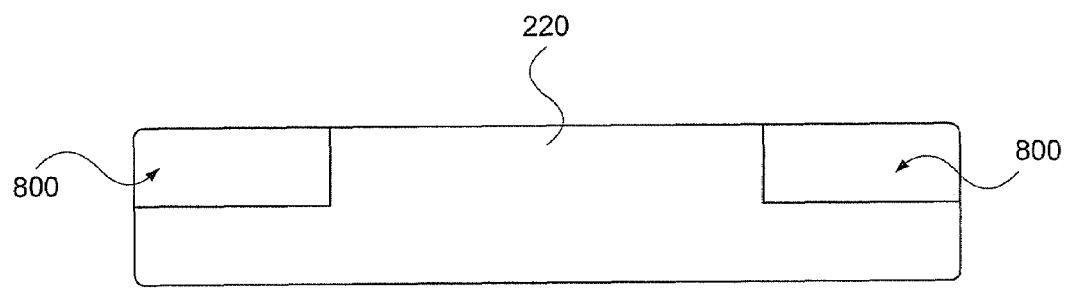
FIG. 8 is a front view of an armrest pad, according to one exemplary embodiment.
Figure 9:
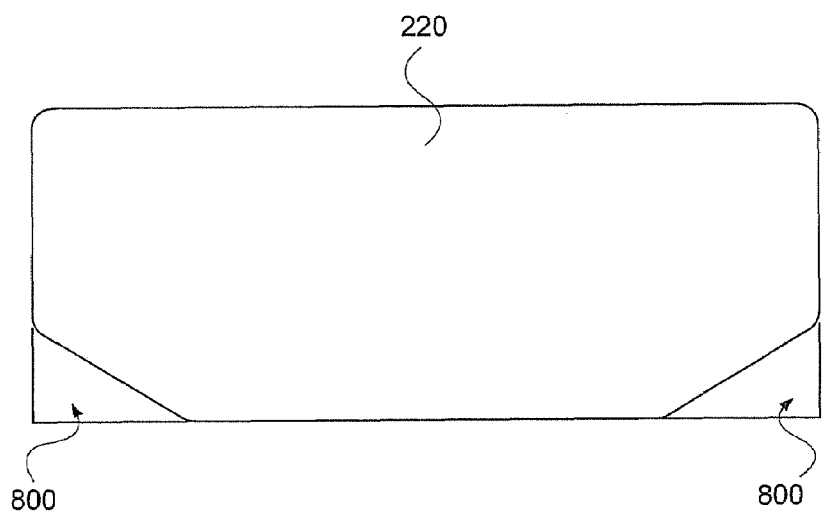
FIG. 9 is a top view of an armrest pad, according to one exemplary embodiment.

Referring now to the exemplary comfort pad (220), as illustrated in FIGS. 3, 8, and 9, a substantially soft material forms the comfort pad. Particularly, according to one exemplary embodiment, the comfort pad (220) may be formed of any number of foams, both open cell and closed cell, gels, encased liquids, beads, particles, powders, and the like, including combinations thereof. Additionally, any number of the afore-mentioned comfort materials may be enclosed in an encapsulating membrane or material. Particularly, according to one exemplary embodiment, a spandex or lycra, neoprene, or gel coating may be formed on a desired material to form the exemplary comfort pad (220). As illustrated in FIGS. 8 and 9, the exemplary comfort pad (220) may include one or more pad cut outs (800) selectively positioned and sized to mate with the previously described recessed retention orifices (700) when inserted onto the pad reception base (710). While a particular comfort pad (220) configuration has been described with particularity herein, any number of geometries or configurations may be used with the present exemplary system and method.

Figure 4:
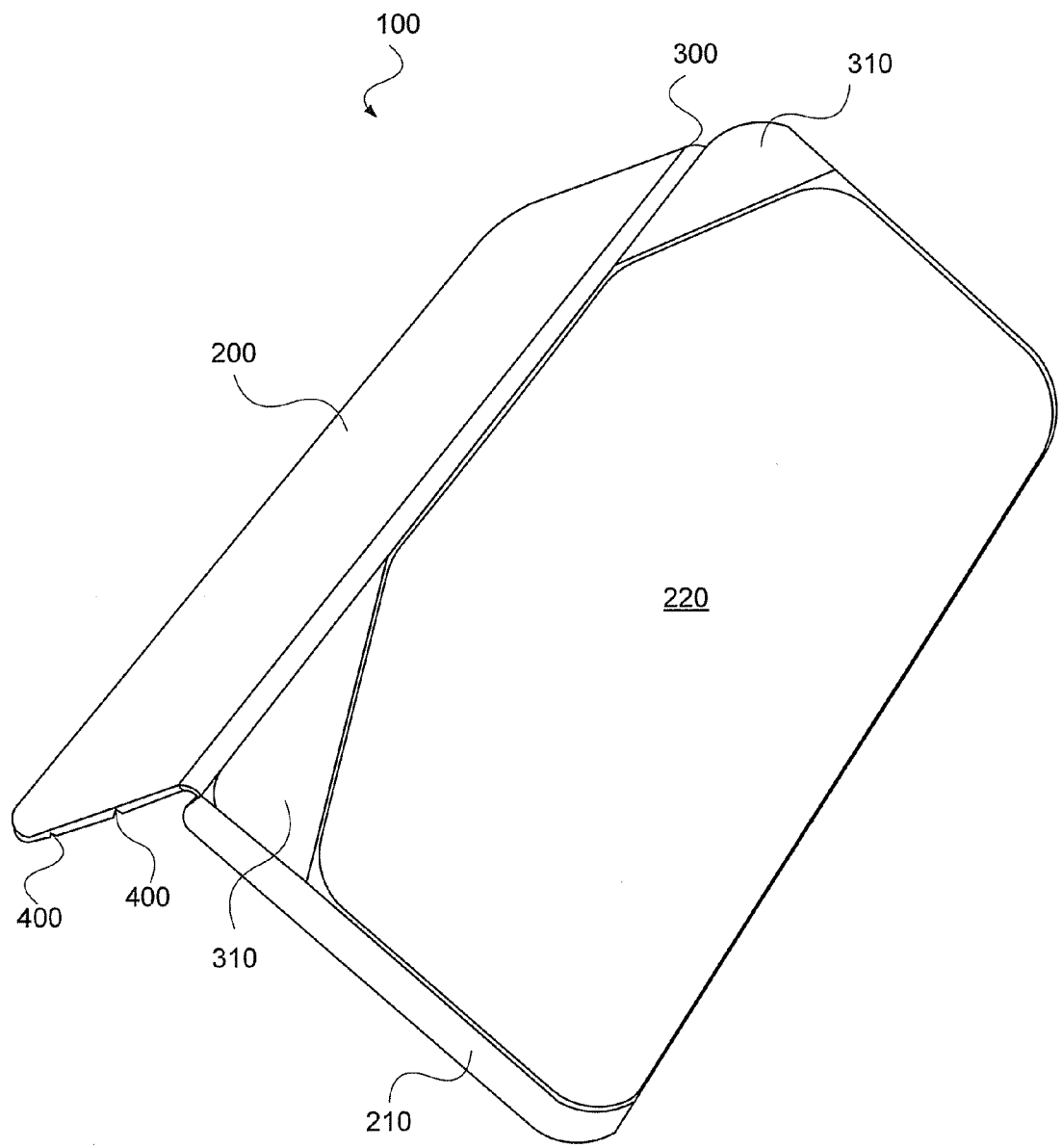
FIG. 4 is a perspective view of an assembled armrest, according to one exemplary embodiment.
Figure 5:
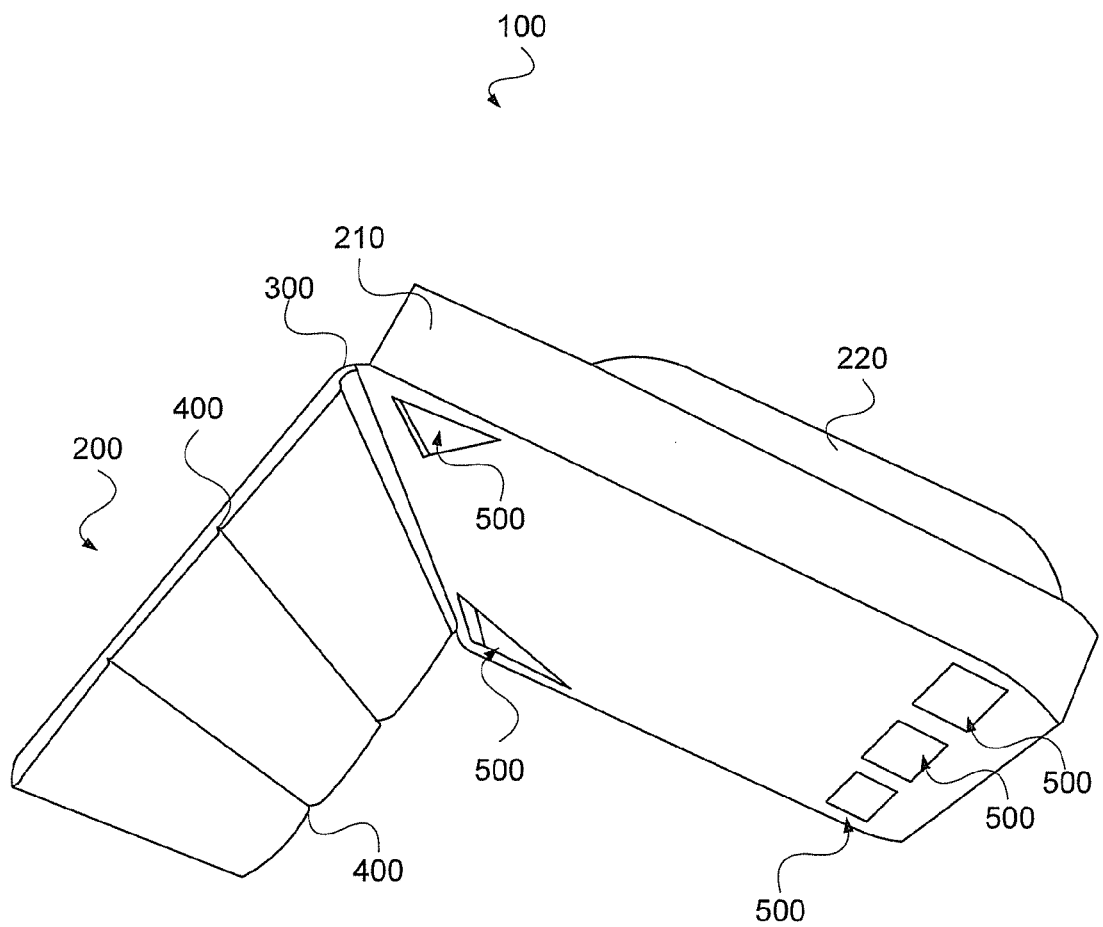
FIG. 5 is a bottom perspective view illustrating an assembled armrest, according to one exemplary embodiment.
Figure 6:
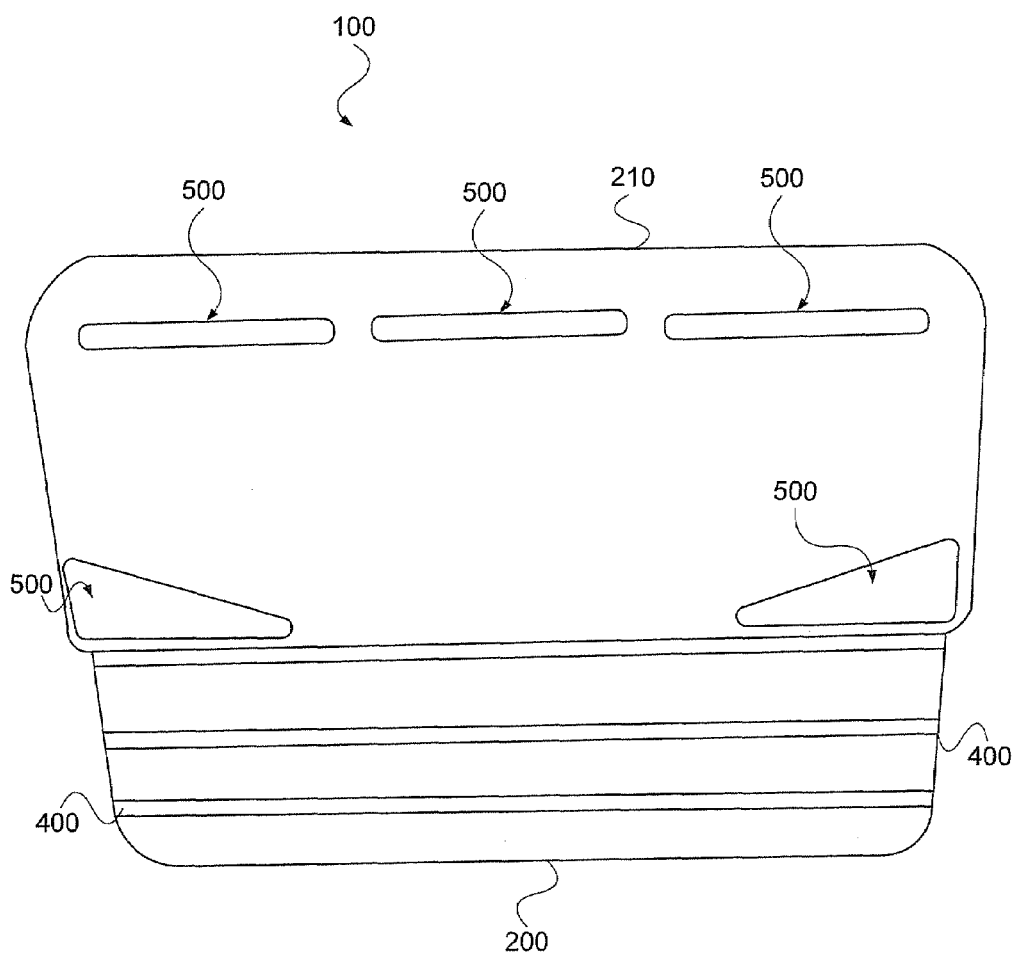
FIG. 6 is a bottom view illustrating an assembled armrest, according to one exemplary embodiment.

Turning now to FIG. 4, an additional feature of the exemplary armrest retention member (200) is illustrated. Particularly, as illustrated in FIGS. 4, 5, and 6, the under portion of the exemplary armrest retention member may include a plurality of reliefs (400) configured to aid in the customization of the present exemplary armrest configuration. According to one exemplary embodiment, the illustrated reliefs (400) function as trim lines or guides for selective removal of portions of the exemplary armrest retention member (200) in order to facilitate insertion of the present exemplary armrest in vehicle door (150) configurations where there is limited space within the door panel (156). According to one exemplary embodiment, a user may be guided in cutting portions of the exemplary armrest retention member (200) by following the reliefs (400). In other exemplary embodiments, the reliefs (400) include perforations or another removal of material configured to allow for the removal of selective portions of the armrest retention member (200) by hand. Alternative relief configurations may facilitate removal by cutting tools such as knives and/or scissors.

Turning now specifically to FIGS. 5 and 6, a number of pad access orifices (500) are illustrated on the under side of the exemplary pad retention member (210). While merely optional to the present exemplary system and method, the pad access orifices (500) illustrated in FIGS. 5 and 6 facilitate access to the comfort pad (220). Particularly, during assembly of the present exemplary armrest configuration, the pad access orifices (500) allow for manipulation and secure insertion of the comfort pad (220) into the pad retention member (210).

According to one exemplary embodiment, the present exemplary system and method is formed by first, forming the pad retention member (210). As mentioned previously, the pad retention member (210) may be formed by a molding process such as injection molding. Once the pad retention member (210) is formed, the comfort pad (220) is inserted into the pad retention member. According to one exemplary embodiment, the comfort pad (220) provides a comfortable surface for the operator of a vehicle to rest his/her elbow or arm on the vehicle door (150). According to one exemplary embodiment, the comfort pad (220) is secured in the pad retention member (210) by an interference fit where friction and interference with the pad interference members (310) maintains the comfort pad (220) within the pad retention member (210). Alternatively or in addition to the above-mentioned interference fit, the comfort pad (220) may be secured in the pad retention member (210) by an adhesive, a mechanical fastener, and the like.

In conclusion, the present exemplary system and method provides a universal armrest that is customizable for selective placement of the armrest in a door of any vehicle. Particularly, according to one exemplary embodiment detailed above, the present exemplary armrest system and method includes a single formed frame or structure configured to securely hold a comfortably soft rest member. Additionally, according to one exemplary embodiment, the single formed support frame includes one or more sizing members configured to facilitate a user in trimming the support frame for use with various vehicles.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. An armrest, comprising:
  a cushioning pad;
  a rigid, single support unit, said single support unit being configured to couple said cushioning pad;
  wherein said rigid, single support unit includes an armrest retention protrusion pivotably coupled to said single support unit;
  wherein said armrest retention protrusion is configured to be mounted in a window orifice of a vehicle; and
  wherein said rigid, single support unit includes a generally rectangular shape, a pad reception base, a plurality of vertical walls protruding from said pad reception base, and at least one pad interference member protruding from at least one of said plurality of vertical walls, said at least one pad interference member being substantially parallel with said pad reception base.

2. An armrest, comprising:
  a cushioning pad;
  a rigid, single support unit, said single support unit being configured to couple said cushioning pad;
  wherein said rigid, single support unit includes an armrest retention protrusion pivotably coupled to said single support unit;
  wherein said armrest retention protrusion is configured to be mounted in a window orifice of a vehicle;
  wherein said armrest retention protrusion further comprises a plurality of reliefs configured to provide varying engagement positions of said armrest retention protrusion; and
  wherein said rigid, single support unit includes a generally rectangular shape, a pad reception base, a plurality of vertical walls protruding from said pad reception base, and at least one pad interference member protruding from at least one of said plurality of vertical walls, said at least one pad interference member being substantially parallel with said pad reception base.

3. An armrest, comprising:
  a cushioning pad;
  a rigid, single support unit, said single support unit being configured to couple said cushioning pad;
  wherein said rigid, single support unit includes an armrest retention protrusion pivotably coupled to said single support unit, wherein said armrest retention protrusion is configured to be mounted in a window orifice of a vehicle;
  wherein said armrest retention protrusion further comprises a plurality of reliefs configured to provide varying engagement positions of said armrest retention protrusion;
  wherein said rigid, single support unit comprises one or more undercuts configured to retain said cushioning pad; and
  wherein said rigid, single support unit further includes a generally rectangular shape, a pad reception base, a plurality of vertical walls protruding from said pad reception base, at least one pad interference member protruding from at least one of said plurality of vertical walls, said at least one pad interference member being substantially parallel with said pad reception base, and wherein said rigid, single support unit further comprises at least one pad access orifice formed in said pad reception base.

* * * * *